United States Patent
Iellimo

(10) Patent No.: US 10,858,185 B1
(45) Date of Patent: Dec. 8, 2020

(54) STRUCTURAL MEMBER WITH STABILIZING PROTRUSIONS

(71) Applicant: FRAZIER INDUSTRIAL COMPANY, Long Valley, NJ (US)

(72) Inventor: Domenick Iellimo, Forked River, NJ (US)

(73) Assignee: Frazier Industrial Company, Long Valley, NJ (US)

( * ) Notice: Subject to any disclaimer, the term of this patent is extended or adjusted under 35 U.S.C. 154(b) by 0 days.

(21) Appl. No.: 16/783,470

(22) Filed: Feb. 6, 2020

(51) Int. Cl.
*B65G 1/04* (2006.01)
*F16B 12/40* (2006.01)
*B65G 1/02* (2006.01)

(52) U.S. Cl.
CPC .............. *B65G 1/04* (2013.01); *B65G 1/02* (2013.01); *F16B 12/40* (2013.01)

(58) Field of Classification Search
CPC ... B65G 1/04; B65G 1/02; F16B 12/40; F16B 7/0446; F16B 2200/205; F16B 21/09
See application file for complete search history.

(56) References Cited

U.S. PATENT DOCUMENTS

| | | | | |
|---|---|---|---|---|
| 3,251,478 A | * | 5/1966 | Frazier | A47B 57/26 211/208 |
| 3,273,720 A | * | 9/1966 | Seiz | A47B 57/402 211/192 |
| 3,480,155 A | * | 11/1969 | Ferdinand | F16B 12/40 211/190 |
| 3,545,626 A | * | 12/1970 | Seiz | A47B 57/487 211/192 |
| 3,877,579 A | * | 4/1975 | Weider | A47B 57/44 211/192 |
| 4,165,944 A | * | 8/1979 | Sunasky | A47B 57/402 403/254 |
| 4,262,809 A | * | 4/1981 | McConnell | A47B 57/50 211/192 |
| 4,425,049 A | * | 1/1984 | Travis | A47B 57/50 403/237 |
| 4,729,484 A | * | 3/1988 | McConnell | A47B 57/402 211/183 |
| 4,928,834 A | * | 5/1990 | Neiman | A47B 57/402 211/191 |
| 4,972,783 A | * | 11/1990 | Crissman | A47B 47/025 108/107 |
| 5,377,851 A | * | 1/1995 | Asano | A47B 47/022 211/191 |
| 5,624,045 A | * | 4/1997 | Highsmith | A47B 57/487 211/191 |
| 6,203,234 B1 | * | 3/2001 | Olson | A47B 57/50 403/254 |

(Continued)

*Primary Examiner* — Ko H Chan
(74) *Attorney, Agent, or Firm* — Dilworth & Barrese, LLP

(57) ABSTRACT

A horizontal support beam is provided with a vertical connection bracket, constructed to attach the horizontal beam to a vertical column of a storage rack system. The vertical connection bracket includes a plurality of protrusions positioned to eliminate some of the gaps that can exist between the bracket and column. The vertical connection bracket can be an L shaped angle bracket. An inside surface of the first arm can include a plurality of protrusions, which can be formed by pressing dimples into the first arm, to help ensure a tight, contacting fit between the inside surface of the first arm and the vertical column.

22 Claims, 7 Drawing Sheets

(56) References Cited

U.S. PATENT DOCUMENTS

| | | | |
|---|---|---|---|
| 6,230,910 B1 * | 5/2001 | Olsson | A47B 57/50 |
| | | | 211/192 |
| 6,510,955 B2 * | 1/2003 | Pellegrino | F16B 7/0446 |
| | | | 211/192 |
| 6,776,298 B2 * | 8/2004 | Courtwright | B65G 1/026 |
| | | | 211/183 |
| 8,727,144 B2 * | 5/2014 | Krummell | B65G 1/02 |
| | | | 211/191 |
| 9,961,995 B2 * | 5/2018 | Kam | A47B 57/485 |
| 10,401,585 B1 * | 9/2019 | Oki | G02B 6/3897 |
| 2012/0267332 A1 * | 10/2012 | Mariani | A47B 96/14 |
| | | | 211/206 |

* cited by examiner

STRUCTURAL MEMBER WITH STABILIZING PROTRUSIONS

BACKGROUND OF THE INVENTION

The invention relates generally to storage racks and more particularly to a support member for a storage rack system for industrial warehouse uses and the like.

Storage racks are commonly used to hold goods, which are often loaded onto pallets. The racks are often four, five or more levels high. The loaded pallets often weigh 2000-3000 pounds. Therefore, the racks often need to be strong enough to support thousands of pounds and can be high off the ground, making proper, tight assembly both important and difficult. An example of a fully assembled storage rack system 100 is shown generally in FIG. 1.

Storage rack 100 includes a plurality of vertical columns 110 extending vertically upward from the floor, ground or other base surface. A plurality of horizontal shelf beams 130 have a vertical connection bracket 136 at the ends thereof. Vertical connection brackets 136 of each horizontal shelf beam 130 are connected to vertical columns 110. The connection between vertical column 110 and horizontal shelf beam 130 may occur between any of the horizontal members and vertical members illustrated in FIG. 1, such as on an end of the storage rack, at any middle connection piece, and along any location on the first, second, third or higher level. Therefore, the connections disclosed herein may be positioned at any location between a horizontal beam and a vertical column.

Horizontal shelf beam 130 is typically formed from steel. Both vertical connection bracket 136 and vertical column 110 are constructed with preformed bolt receiving holes to facilitate assembly of storage rack 100 in a warehouse, yard or other storage facility. If, for example, storage rack 100 is intended to be assembled with ½ inch bolts, the bolt receiving holes will be about 9/16 inch diameter to facilitate bolt insertion. Construction of horizontal shelf beam 130 typically involves the bending, rolling, stamping and/or welding of steel pieces. Therefore, it is inconvenient and not cost effective to form horizontal beam 130 with clean, precise corners and highly precise dimensions. Also, rounded corners with can be stronger than highly angular corners with a sharp vertex.

Based on the realities of construction, the parts of rack 100 are typically designed with sufficient "play" to permit the preformed holes of the connection brackets to conveniently overlap the preformed holes of the vertical column. Consequently, it is often the case that gaps of about 1/16 inch to ¼ inch will exist between bracket 136 and column 110 to accommodate the imprecisions in the construction process and to make assembly more convenient. However, these gaps can lead to imprecise fitting of the final construction. On the other hand, it can be important that all the pieces fit well enough for a secure assembly to support thousands of pounds, well off the ground, without undue wobble and sway. The excessive wobble and sway of loosely fitting parts can unsatisfactorily decrease the strength, stability and durability of storage rack 100.

Accordingly, it is desirable to provide a storage rack system that overcomes at least some of the defects in existing structures to provide better fitting assembly parts that are convenient to construct and assemble, yet exhibit improved fit.

SUMMARY OF THE INVENTION

Generally speaking, in accordance with the invention, a horizontal support beam is provided with a vertical connection bracket, constructed to attach the horizontal beam to a vertical column of a storage rack system. The vertical connection bracket includes a plurality of protrusions positioned to eliminate some of the gaps of about 1/16 to ¼ or more that can be caused by the realities of constructing high strength steel storage rack system parts.

The horizontal beam comprises a central support section and vertical connection brackets at each end of the support section. The vertical connection brackets can be L shaped angle brackets formed by rolling, stamping, welding or bending steel sheets. The brackets can be joined to the support section by welding, bolting and other conventional methods. The support section can have a C shaped or I shape cross-section extending longitudinally in the horizontal direction. A C-beam is preferred. The vertical connection brackets can have an L shaped cross-section with first and second arms. The inside surface of the connection bracket, which faces the vertical column, can have a rounded vertex where the first and second arms meet on. An outside surface of the first arm can be connected, such as by welding, to one or both ends of the support section.

An inside surface of the first arm, which faces the vertical column, can include a plurality of protrusions (projections). The protrusions can be formed by pressing dimples from the outside surface of the first arm. The protrusions improve the contacting fit between the inside surface of the first arm and the vertical column, which can be about 1/16 to ¼ inches apart, more commonly about 2/16 to 4/16 inches, most commonly about 2/16 to 3/36 inches. The second arm of the connection bracket can have pre-formed bolt receiving holes that overlap corresponding bolt receiving holes on the vertical column. This arm is bolted to and typically lays flat against the vertical column. In another embodiment of the invention, the preformed holes on the connection bracket can be on the first arm, which faces the vertical column, with the protrusions on the second arm. In another embodiment of the invention, the holes and protrusions can be on both the first and second arms.

The protrusions should be sized and positioned to contact the vertical column when the preformed bolt receiving holes in the connection bracket arm are positioned over corresponding bolt receiving holes in the vertical column and then bolted into place. The protrusions on the bracket can be formed in a variety of ways. In one embodiment of the invention, the projections are formed by pressing dimples in a direction from the outside surface of the bracket arm towards the inside surface of the arm, to form convex dimpled bulges on the inside surface. The protrusions can also be formed by applying bulges of material, such as welding material, on the inside surface. Those in the art will understand different ways to form gap filling protrusions on the inside surface of the connection bracket.

In another embodiment of the invention, a flap protrusion, such as in the shape of a pie-shaped wedge can be formed by pressing into the first arm with enough force to separate a portion of the dimple from the first arm, to leave a gap. This will permit the open end of the dimple to bend back towards the first arm when the connection bolt is tightened and the inside surface of the connection bracket is pressed against the vertical column, making for an even tighter connection.

BRIEF DESCRIPTION OF THE DRAWINGS

FIG. 1 is a partial perspective view of an industrial storage rack system for a warehouse and the like;

The figures are exemplary and should not be interpreted to be limiting. Like reference numerals indicate similar parts throughout the figures. Dimensions and proportions are not limiting.

DETAILED DESCRIPTION OF THE PREFERRED EMBODIMENTS

The present disclosure may be understood more readily by reference to the following detailed description of the disclosure taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying drawings.

Figure 1:
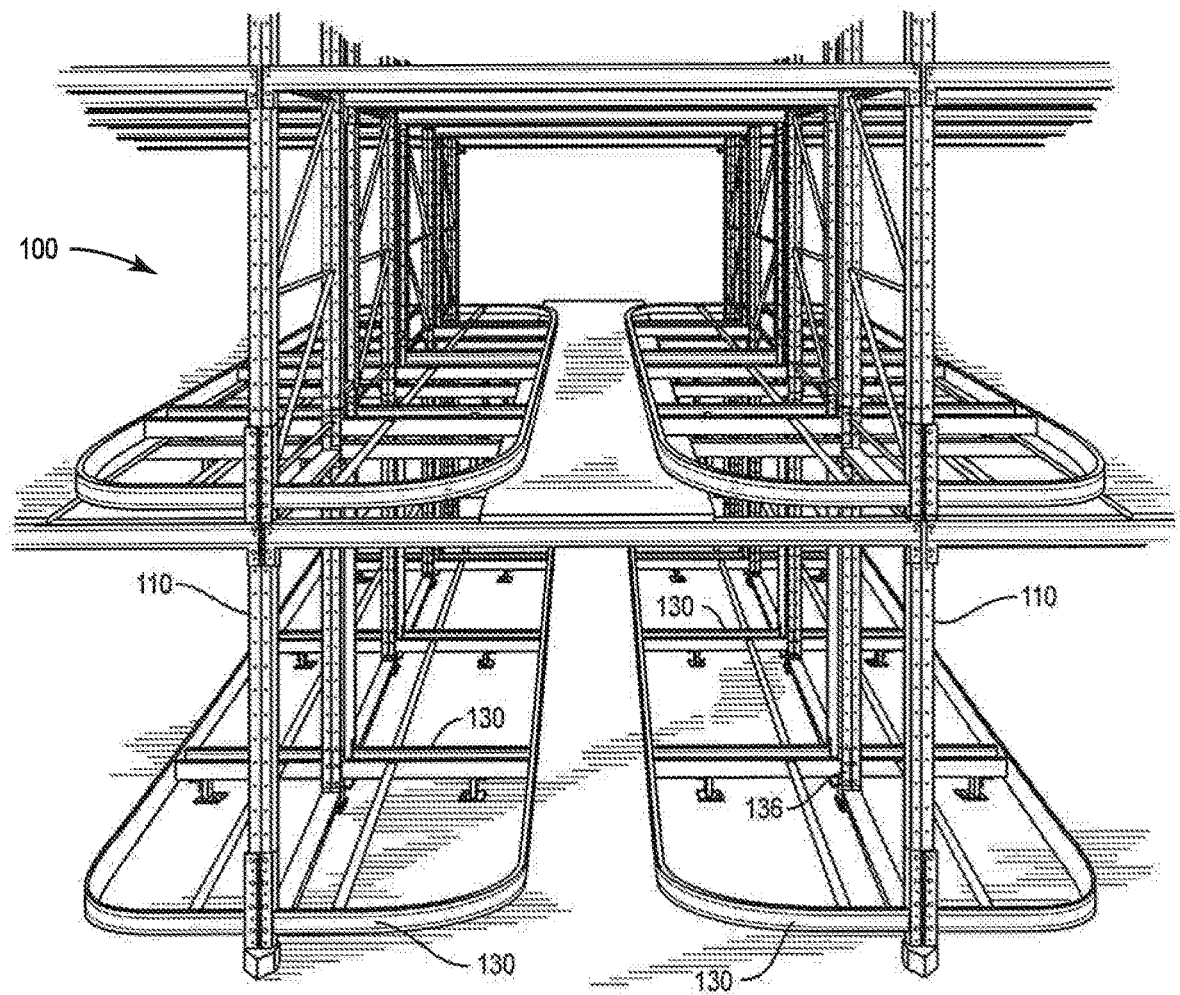

Referring to FIG. 1, rack system 100 comprises a multiple level storage rack, wherein horizontal support beams 130 are connected to vertical columns 110 with vertical connection brackets 136. Horizontal beams 130 can be used to support various objects, such as pallets, loaded with goods. These loaded pallets can weigh 2000-3000 pounds.

Figure 2A:
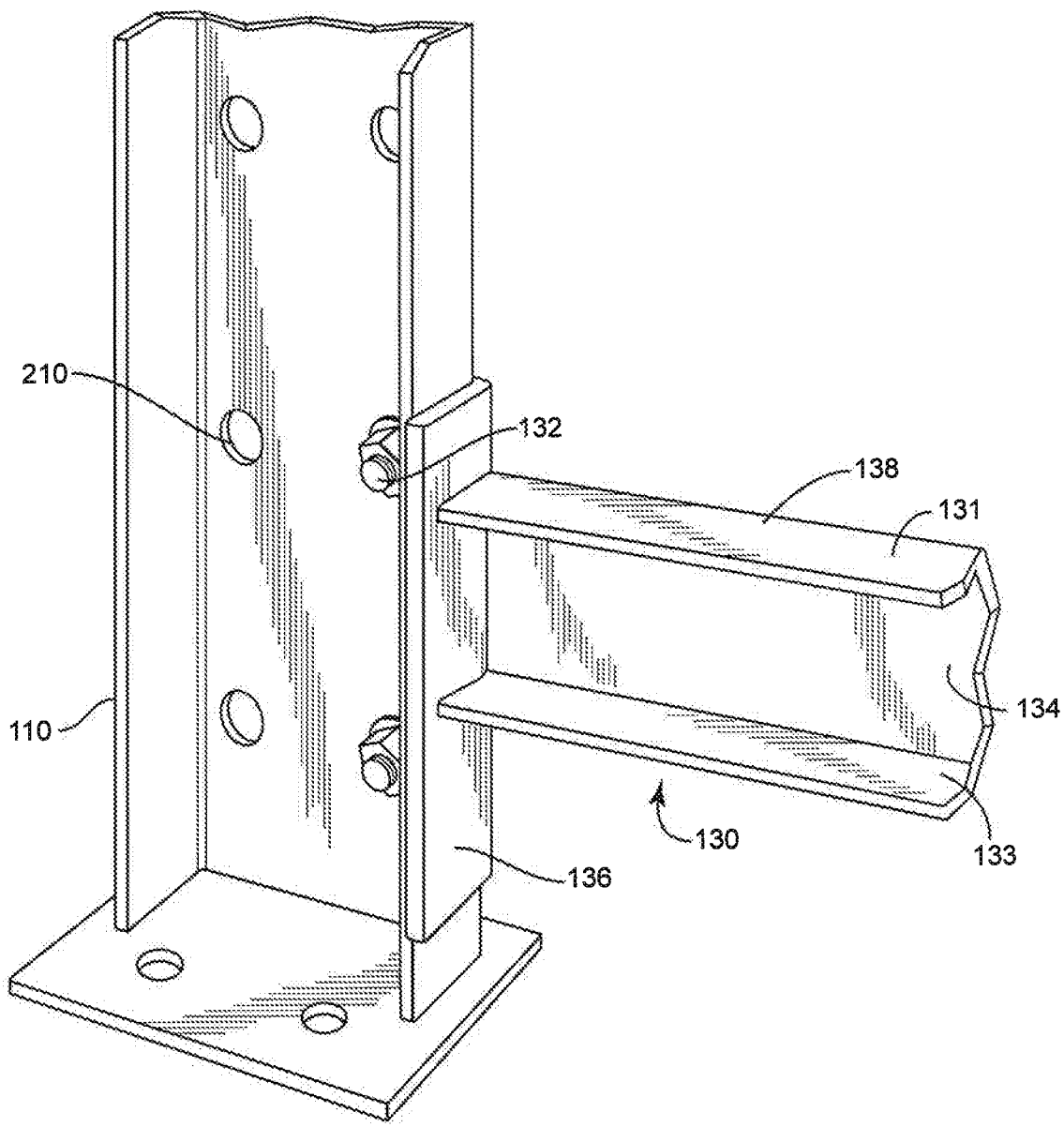
FIG. 2A is a partial perspective view of a horizontal beam with a vertical connection bracket bolted to a vertical column of the rack system of FIG. 1.
Figure 2B:
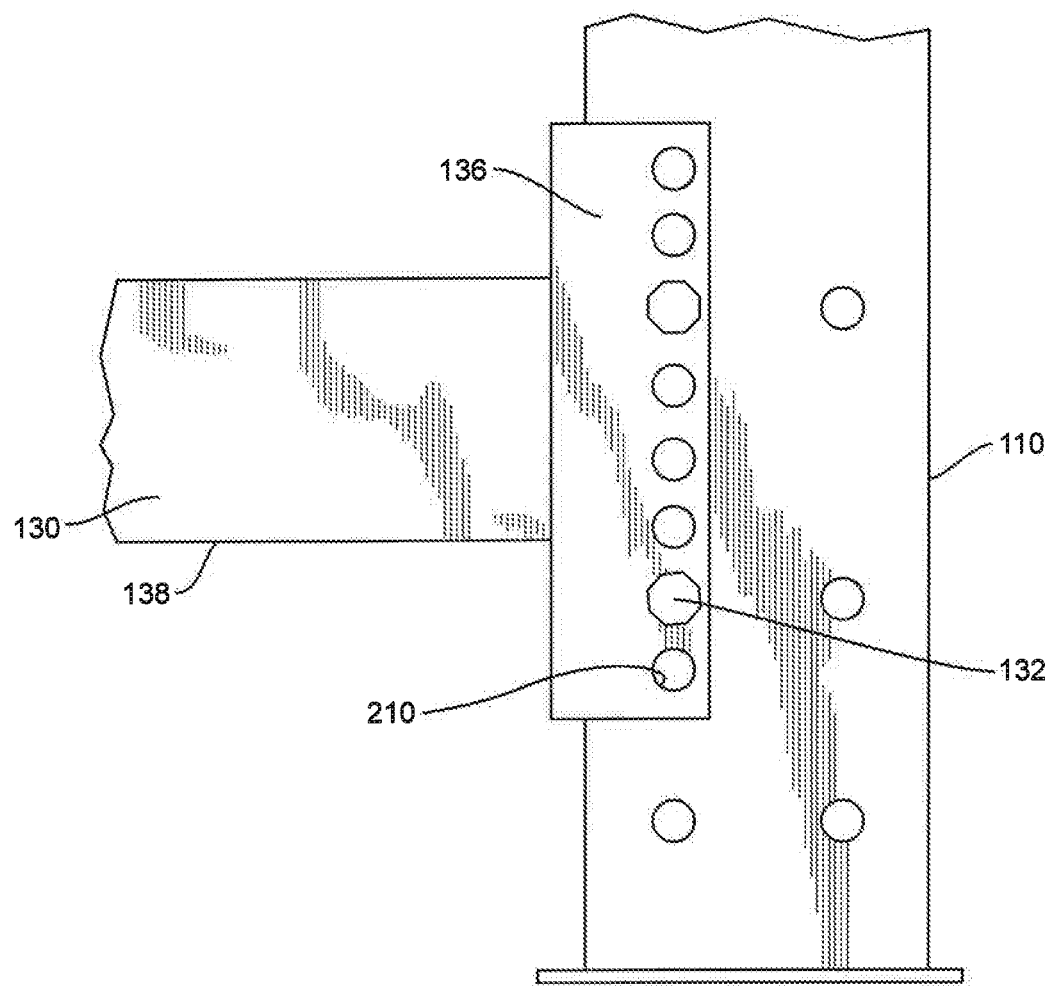
FIG. 2B is a partial side view of a horizontal beam with a vertical connection bracket bolted to a vertical column of the rack system of FIG. 1
Figure 3:
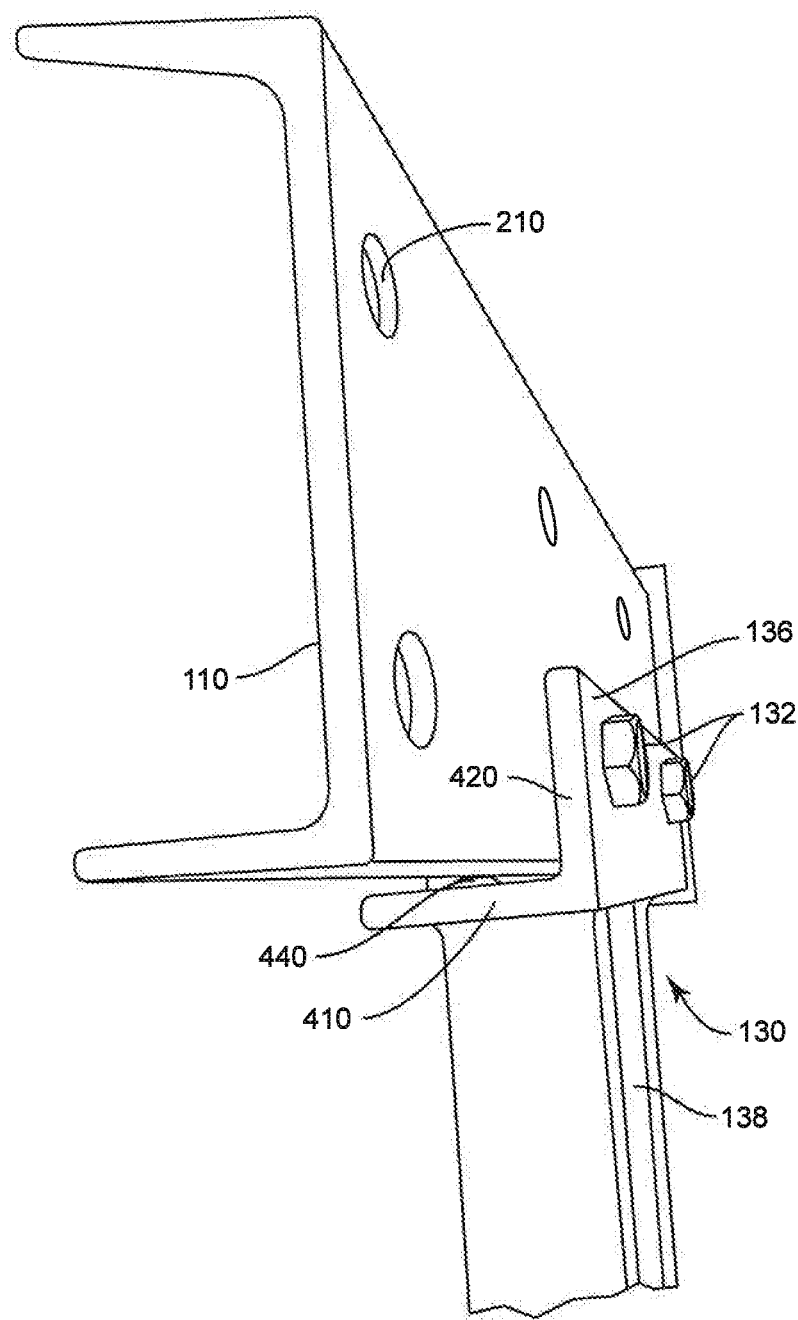
FIG. 3 is a partial perspective view of a horizontal beam with a vertical connection bracket bolted to a vertical column of the rack system of FIG. 1, illustrating the gap that can exist between the connection bracket and the vertical column and a protrusion from the connection bracket to help eliminate the effects of the gap.

Referring to FIGS. 2A and 2B, horizontal support beams 130 includes a support portion 138, which can be a C-beam, formed from steel. Support portions 138 can have an upper flange 131, a lower flange 133 and a vertical wall (web) 134 therebetween. Vertical wall 134 can be 1/16 inch, 1/8 inch, 3/16 inch or another thickness. A vertical connection bracket 136 of horizontal beam 130 is joined to each end of support portion 138. Bracket 136 can be formed by stamping, rolling, welding or bending. It can be joined to support portion 138 by well understood methods, such as welding or bolting.

Figure 4:
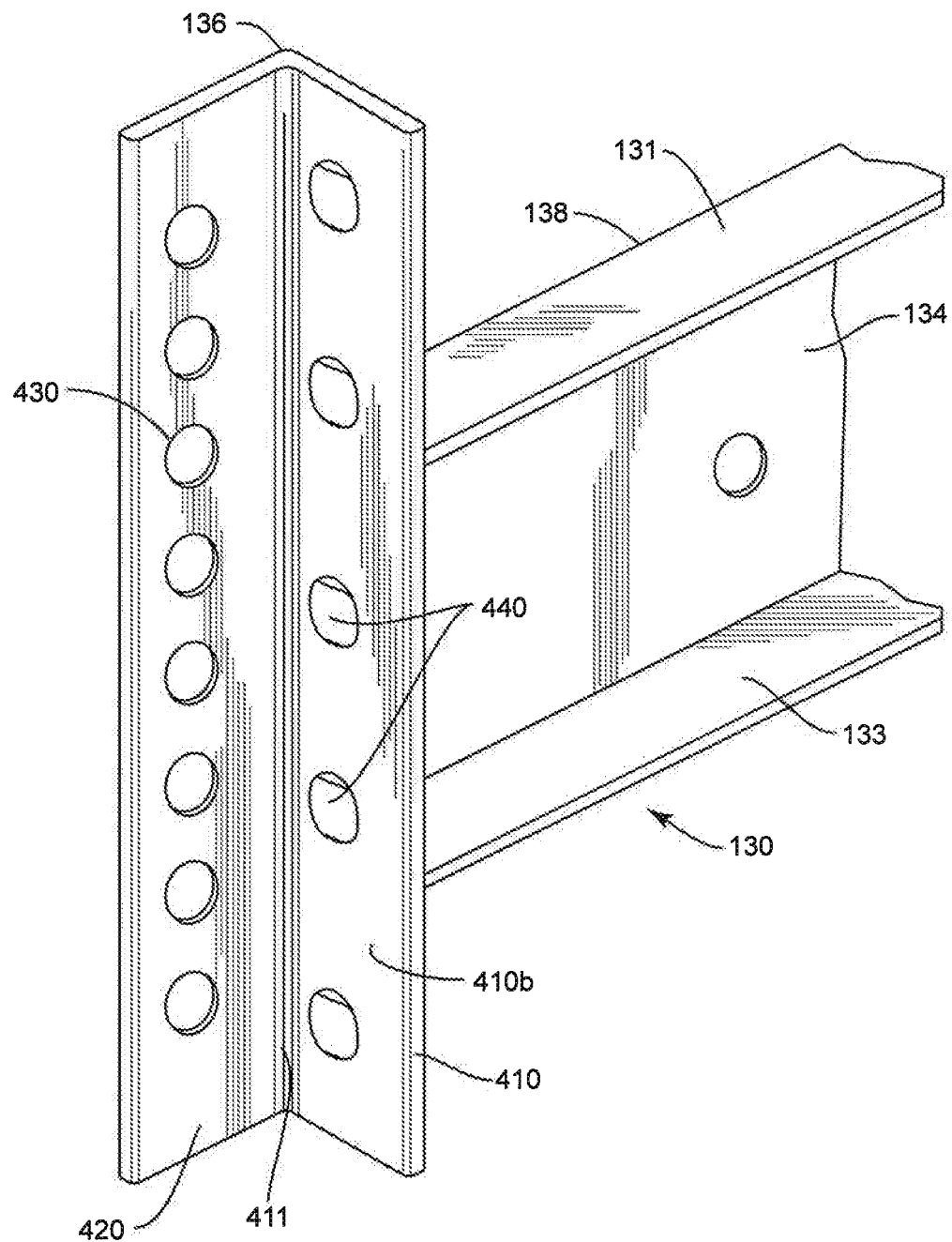
FIG. 4 is a partial perspective view of a horizontal beam with a connection bracket having protrusions, in accordance with aspects of the present disclosure.
Figure 5:
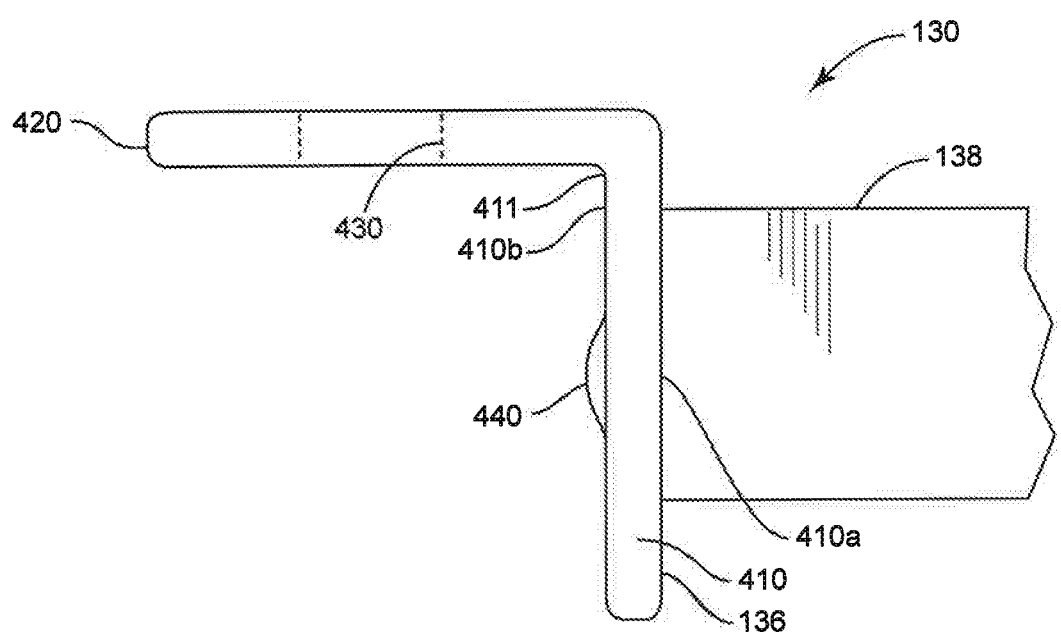
FIG. 5 is a partial top plan view of a horizontal beam with a connection bracket having protrusions, in accordance with aspects of the present disclosure.

Referring to FIGS. 4 and 5, connection bracket 136 has an L shaped cross-section with a first arm 410 and a second arm 420. First arm 410 and second arm 420 can be about 2/16 to 4/16 inches thick, preferably about 3/16 inches thick. First arm 410 includes an outside surface 410a and an inside surface 410b. Outside surface 410a is joined to an end of support portion 138, preferably by welding. Inside surface 410b faces vertical column 110. Second arm 420 is attached to column 110 with fasteners, such as a plurality of bolts 132 and therefore typically lays flat against column 110. A vertex 411 where inside surface 410a meets second arm 420 should be rounded. Preferably, vertex 411 is concave. However, vertex 411 can also be convex or substantially flat.

A plurality of bolt receiving holes 430 are formed through second arm 420. These holes should be slightly larger than the nominal diameter of bolts 132. Therefore, if half inch bolts are intended, the holes should be about 9/16 inches in diameter. A plurality of holes 210 are formed through vertical column 110. To attach horizontal support beam 130 to vertical column 110, holes 430 through connection bracket 136 are lined up with holes 210 through column 110. Bolts 132 are then inserted through holes 430 and 210 and a nut is used to secure the attachment such that arm 420 is flat against column 110.

Due to the realities of construction, connection bracket 136 is formed to provide some play between inside surface 410b and column 110. This play decreases the security of the connection and can lead to reductions in the strength and rigidity of rack 100. Thus, there will typically be about a 1/16, 2/16, 3/16, 4/16 or another sized gap between column 110 and inside surface 410b. Accordingly, to reduce wobble and weakness caused by this gap, a plurality of protrusions 440 are provided on inside surface 410b, to help fill this gap, reduce wobble and play, but still permit holes 430 of connection bracket 136 to be conveniently aligned with holes 210 of column 110.

Protrusions 440 can be formed as dimples, pushed through outside surface 410a. Protrusions 440 can also be formed as material, e.g., welding material, deposited on the face of inside surface 410b. Other methods of forming such bulges will be apparent to those skilled the art. The height of protrusions 440 can be about 1/16 to 4/16 inches, preferably about 2/16 to 3/16 inches. They are preferably about 4/16 to 12/16 inches, more preferably about 6/16 to 10/16 inches long in the vertical direction of bracket 136. Protrusions 440 can extend along 1/4 to 3/4, preferably about 3/8 to about 5/8, most preferably about 2/5 to about 4/5 of the length of inside surface 410b. Protrusions 440 are preferably substantially centrally located between vertex 411 and the outer edge of first arm 410. Preferably, there are about 2 to 12, more preferably 4 to 6 and most preferably 5 protrusions, preferably positioned in line along the longitudinal axis of first arm 410. Protrusions 440 preferably extend about 0.3 to 0.7, preferably about 0.5 inches from inside surface 410b.

Bracket 136 is preferably about 6 to 12 inches long, more preferably about 8 to 10 inches long, most preferably about 9 inches long. Holes 430 through second arm 420 should be at a distance of least about half the width of the arm from vertex 411. Thus, if second arm 420 is about 1.5 inches wide and holes 430 are about 0.5 inches in nominal diameter, entire hole 430 should be more than about 0.5 inches, preferably more than about 0.7 inches from vertex 411.

Bracket 136 should be at least twice the height of support portion 138. Therefore, if support portion 138 has a height of about 3-4 inches, bracket 136 is preferably about 6-12 inches long, more preferably about 6-10 inches long. Preformed holes 430 should account for less than about half the length of bracket 136. Therefore, if holes 430 have a nominal diameter of about 0.5 inches and bracket 136 is 9 inches long, there should be about 9 or fewer, preferably 8 or fewer holes through second arm 420.

Figure 6:
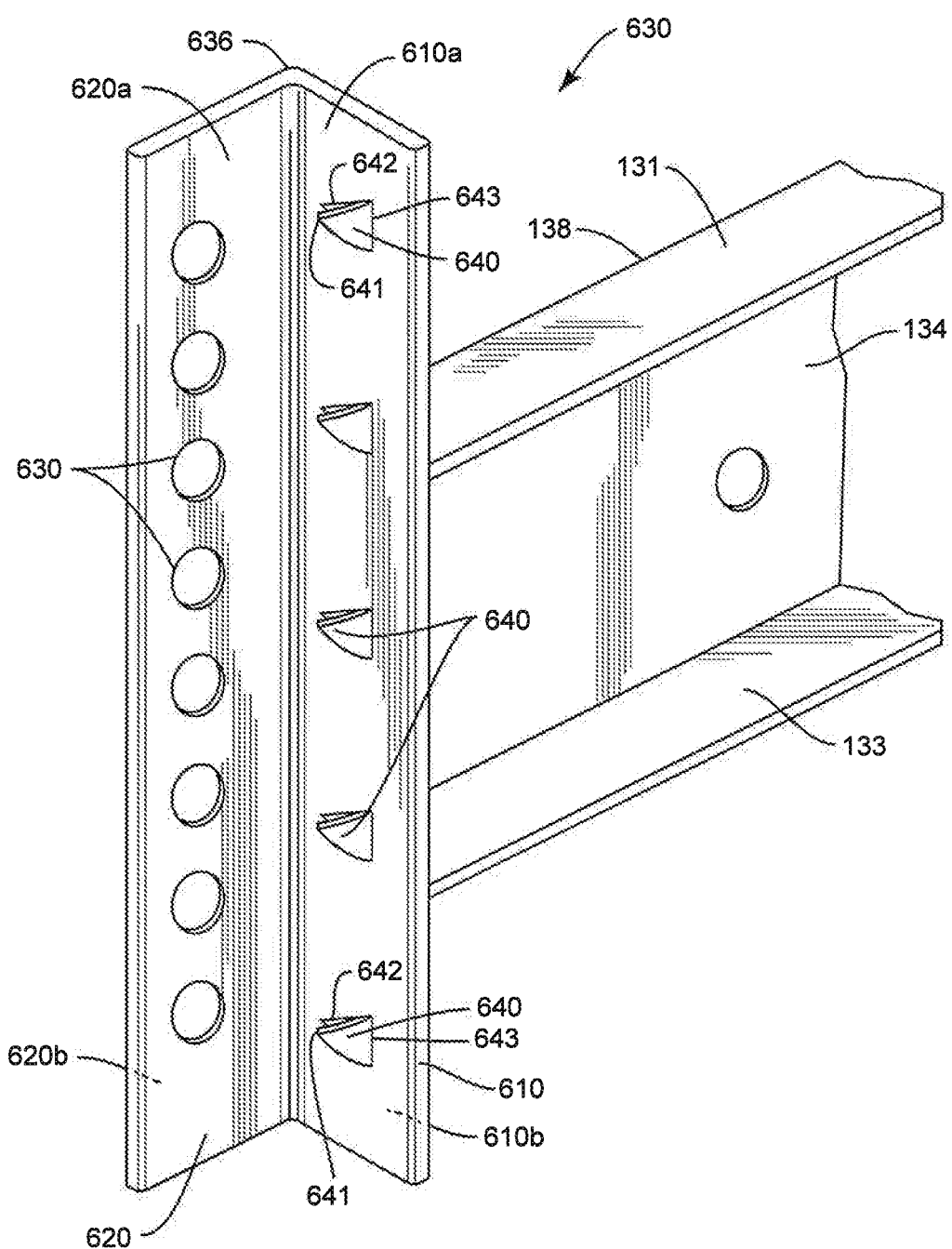
FIG. 6 is a partial perspective view of a horizontal beam with a connection bracket having protrusions, in accordance with another aspect of the present disclosure.

A shelf beam 630 having a connection bracket 636, in accordance with another embodiment of the invention, is shown in FIG. 6. Connection bracket 636 is similar to connection bracket 136 of FIG. 4. Connection bracket 636 has an L-shaped cross-section with a first arm 610 and a second arm 620. The dimensions of shelf beam 630 can be about the same as those of shelf beam 130.

An outside surface 610b of connection bracket 636 is joined to and end of support portion 138, preferably by welding. An inside surface 610a of bracket 636 faces vertical column 110. Second arm 620 is attached to column 110 with fasteners, such as a plurality of bolts and therefore typically lays flat against column 110. A plurality of bolt receiving holes 630 are formed through second arm 620. Holes 630 can be similar in position, nature and dimension as bolt receiving holes 430.

A plurality of protrusions 640 are provided on inside surface 610a. Protrusions 640 are similar to intrusions 440, except that protrusions 640 are formed as a ramp or wedge, with a low end 643 level to the plane of inside surface 610a and a high end 641 that is farthest away from the plane of inside surface 610a. Protrusions 640 can be formed by pressing on outside surface 610b.

High end 641 can either remain connected the material of first arm 610 or can be free of first arm 610, such that the high portion of protrusions 640 are clear of inside surface 610a, and an opening 642 exists in first arm 610, where the material of protrusion 640 had been. Protrusions 640 can remain attached to the first arm 610 at a bend or "hinge" 643, in the form of an extremely rigid, yet partially flexible living hinge. Protrusions 640 act as a wedge. As the bolts through holes 630 are tightened, protrusions 640 can move against column 110, with low end 643 as the leading end and high end 641 as the primary contact point. Protrusions 640 are depicted as triangular, but can also be rectangular, oval or any other shape with a high end and low end to act as a wedge or shim to tighten any gap between first arm 610 and column 110.

High end 641 should be formed to extend past the plane of inside surface 610a by a distance greater than the typical gap between inside surface 610a and column 110. Therefore, as connection bracket 636 is tightened against vertical column 110, protrusions 640 will first fill the gap and then can be bent back towards inside surface 610a. High end 641 of protrusion 640 can extend $1/16$, $2/16$, $3/16$, or $4/16$ inches or even farther (or less) from the plane defined by inside surface 610a. Thus, protrusions 640 can act similar to a lock washer and low end can act as a living hinge. Any elasticity at protrusion 640 can provide additional security between connection bracket 636 and vertical column 110, further eliminating any wobble or looseness.

It is also preferred to attach the end of support portion 138 to first arm 410 at an upper portion of bracket 136. Support portion 138 will become loaded and create torque on bracket 136. Therefore, it is advantageous to have more of bracket 136 extending below support portion 138 than above support portion 138. In particular, the length of bracket 136 below support portion 138 should be at least 1.5, preferably about twice the length of bracket 136 extending above support portion 138.

The foregoing can allow a storage rack to hold additional weight and therefore more goods or products with less wobble and shifting. This can save costs by allowing companies, such as in a warehouse, to require fewer storage racks since additional weight can be held by a single storage rack. In addition, repair costs may be reduced by fewer fastening mechanisms breaking as a result of excess movement exerted against the fastening mechanism. Less steel can be used to provide a rack of the same strength. In this regard, safety is also increased because the overall storage racks are less prone to failure.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed, is:

1. A structural support system, comprising:
    an elongated support member having a first support member end, a second support member end, and a central support portion extending in a first direction from the second support member end to the first support member end;
    a connection bracket extending in a second direction along a longitudinal axis of the connection bracket, the second direction perpendicular to the first direction, the connection bracket having a first arm and a second arm extending along the longitudinal axis, the first and second arms joined at a vertex of the connection bracket, the first arm having an inside surface opposite an outside surface, the outside surface joined to and facing the first support member end, the second arm extending in the first direction from the vertex;
    a support column having a contact surface extending in the second direction and facing the inside surface of the first arm;
    the inside surface of the first arm including at least one protrusion extending in the first direction from the inside surface of the first arm, the protrusion pressed against the contact surface of the support column; and
    the second arm including at least one bolt receiving hole therethrough.

2. The structural support beam of claim 1, wherein the second arm includes a plurality of bolt receiving holes therethrough and a plurality of protrusions extend in the first direction from the inside surface of the first arm.

3. The structural support beam of claim 1, wherein the first and second arms of the connection bracket are from about $2/16$ inch to $4/16$ inch thick.

4. The structural support beam of claim 1, wherein a bolt extends through the at least one hole in the second arm and through the column, and the connection bracket is held pressed against the contact surface by the at least one bolt.

5. The structural support beam of claim 1, wherein the at least one protrusion extends about $1/16$ to $4/16$ inches, in the first direction, from the inside surface of the first arm.

6. The structural support beam of claim 5, wherein a second connection bracket is joined to the second support member end, and the second connection bracket is substantially a mirror image of the first connection bracket.

7. The structural support beam of claim 2, wherein the connection bracket is about 6 to 12 inches long in the second direction and the plurality of protrusions are about 0.5 inches long in the second direction.

8. The structural support beam of claim 7, wherein the plurality of protrusions extend along about ¼ to ¾ of the length of the inside surface of the first arm, in the second direction.

9. The structural support beam of claim 1, wherein the attachment of the first support member end to the outside surface of the first arm is off centered, in the second direction.

10. The structural support beam of claim 2, wherein there are 4-6 protrusions extending from the inside surface of the first arm and the protrusions have two ends, with one end formed as a living hinge at the inside surface of the first arm and the other end in a state of compression towards the inside surface of the first arm by compression from the contact surface.

11. A support structure, comprising:
- a vertical column extending in a vertical direction and having a contact surface;
- a horizontal support member having a first support member end, a second support member end, and a central support portion, the horizontal support member extending in a first horizontal direction, perpendicular to the vertical direction, extending from the second support member end to the first support member end;
- a connection bracket extending in the vertical direction along a longitudinal axis of the connection bracket, the connection bracket having a first arm and a second arm perpendicular to the first arm, the first and second arms joined at a vertex of the connection bracket, the first arm having an inside surface opposite an outside surface, the outside surface joined to and facing the first support member end, the second arm extending from the vertex in the first horizontal direction; and
- the inside surface of the first arm facing the vertical column with a gap therebetween, and at least one protrusion extending in the first horizontal direction across the gap, from the inside surface toward the vertical column and pressed against the contact surface.

12. The support structure of claim 11, wherein the second arm includes a plurality of bolt receiving holes overlapping a plurality of bolt receiving holes through the vertical column with at least one bolt extending through at least one of those overlapping holes and a plurality of protrusions extend in the first horizontal direction from the inside surface of the first arm pressed against the contact surface, the protrusions substantially filling a gap between the inside surface and the vertical column.

13. The support structure of claim 11, wherein the first and second arms of the connection bracket are from about 2/16 inch to 4/16 inch thick.

14. The support structure of claim 12, wherein the vertex is rounded and the connection bracket is bolted to the vertical column by at least two bolts.

15. The support structure of claim 12, wherein the plurality of protrusions extend about 1/16 to 4/16 inches in the horizontal direction, from the inside surface of the first arm to, and not through the contact surface.

16. The support structure of claim 15, wherein a second connection bracket is joined to the second support member end, and the second connection bracket is substantially a mirror image of the first connection bracket.

17. The support structure of claim 12, wherein the connection bracket is about 6 to 12 inches long in the vertical direction and the plurality of protrusions are about 0.4 to 0.6 inches long in the vertical direction.

18. The support structure of claim 17, wherein the plurality of protrusions extend along ¼ to ¾ of the length of the inside surface of the first arm, in the vertical direction.

19. The support structure of claim 11, wherein the attachment of the first support member to the outside surface of the first arm is off centered, in the vertical direction, with more of the connection bracket extending below the support member than above the support member.

20. The support structure of claim 12, wherein there are 4-6 protrusions extending from the inside surface of the first arm.

21. The support structure of claim 11, wherein the at least one protrusion has two ends, with one end formed as a living hinge at the inside surface of the first arm and the other end in a state of compression from the contact surface towards the inside surface of the first arm.

22. The support structure of claim 11, and comprising multiple wobble reduction means on the surface of the first arm for reducing wobble between the bracket and the contact surface as the bracket is bolted to the column.

* * * * *